US008645096B2

(12) United States Patent
Lape et al.

(10) Patent No.: US 8,645,096 B2
(45) Date of Patent: Feb. 4, 2014

(54) DEFLECTION MEASURING SYSTEM AND METHOD

(75) Inventors: Brock Matthew Lape, Clifton Park, NY (US); William Gene Newman, Scotia, NY (US); Stuart Alan Oliver, Malvern, AR (US)

(73) Assignee: General Electric Company, Schenectady, NY (US)

( * ) Notice: Subject to any disclaimer, the term of this patent is extended or adjusted under 35 U.S.C. 154(b) by 359 days.

(21) Appl. No.: 13/023,780

(22) Filed: Feb. 9, 2011

(65) Prior Publication Data

US 2012/0203499 A1    Aug. 9, 2012

(51) Int. Cl.
*G06F 15/00* (2006.01)

(52) U.S. Cl.
USPC ... 702/150; 438/18; 324/750.16; 324/750.27; 324/754.12; 324/754.07; 324/754.14; 324/755.01; 324/756.07; 324/756.04; 324/755.11

(58) Field of Classification Search
USPC .......... 702/150; 73/866.5; 439/348, 482; 438/18, 462; 324/750.16, 750.27, 324/754.12, 750.25, 755.02, 754.11, 324/754.07, 754.13, 754.14, 755.01, 324/750.23, 750.22, 763.23, 755.09, 324/763.01, 756.07, 756.04, 750.26, 755.11
See application file for complete search history.

(56) References Cited

U.S. PATENT DOCUMENTS

| | | | |
|---|---|---|---|
| 4,455,754 A * | 6/1984 | Benjamin | 33/557 |
| 4,605,880 A * | 8/1986 | McCandless et al. | 313/414 |
| 5,020,234 A * | 6/1991 | Alkire et al. | 33/656 |
| 5,497,147 A | 3/1996 | Arms et al. | |
| 6,046,599 A * | 4/2000 | Long et al. | 324/750.16 |
| 6,064,214 A * | 5/2000 | Self | 324/754.12 |
| 6,091,256 A * | 7/2000 | Long et al. | 324/754.12 |
| 6,256,767 B1 * | 7/2001 | Kuekes et al. | 365/151 |
| 6,343,369 B1 * | 1/2002 | Saunders et al. | 324/755.01 |
| 6,622,289 B2 * | 9/2003 | Saunders et al. | 438/18 |
| 6,805,572 B1 * | 10/2004 | Lai | 439/348 |
| 6,957,405 B2 * | 10/2005 | Saunders et al. | 438/18 |
| 7,001,199 B1 * | 2/2006 | Badalpour | 439/348 |
| 7,331,795 B2 * | 2/2008 | Duke | 439/66 |
| 7,386,816 B2 * | 6/2008 | Saunders et al. | 438/18 |
| 7,542,872 B2 * | 6/2009 | Kadowaki et al. | 702/168 |
| 7,819,035 B2 * | 10/2010 | Draper et al. | 73/866.5 |
| 8,056,031 B2 * | 11/2011 | Saunders et al. | 716/106 |
| 8,160,702 B2 * | 4/2012 | Mann et al. | 607/9 |
| 8,310,120 B2 * | 11/2012 | Andarawis et al. | 310/68 B |
| 2001/0054317 A1 | 12/2001 | Arms | |
| 2003/0106511 A1 * | 6/2003 | Haskara et al. | 123/90.11 |
| 2004/0126182 A1 * | 7/2004 | Lin | 403/322.2 |
| 2008/0309357 A1 * | 12/2008 | Yang et al. | 324/754 |
| 2009/0239316 A1 * | 9/2009 | Li | 438/17 |
| 2009/0255352 A1 * | 10/2009 | Draper et al. | 73/866.5 |
| 2011/0080588 A1 * | 4/2011 | Segall | 356/445 |
| 2011/0315611 A1 * | 12/2011 | Fulkerson et al. | 210/96.2 |

* cited by examiner

*Primary Examiner* — Carol S Tsai
(74) *Attorney, Agent, or Firm* — Cantor Colburn LLP (57) ABSTRACT

A deflection measurement probe includes a body portion having a cavity defined by the body portion, a first positional measurement sensor disposed in the cavity of the body portion, the first positional measurement sensor including a sensor tip extending from the body portion operative to contact a measurement surface, and a second positional measurement sensor disposed in the cavity of the body portion, the first positional measurement sensor including a sensor tip extending from the body portion operative to contact a measurement surface.

18 Claims, 8 Drawing Sheets

DEFLECTION MEASURING SYSTEM AND METHOD

BACKGROUND OF THE INVENTION

The subject matter disclosed herein relates to industrial testing systems and particularly to a system for detecting deflection of components of industrial machines.

Deflection may be defined as the amount a structural component is displaced or deformed under a load. In many industrial machines, such as, for example, large scale generators, components such as ripple springs are compressed during installation. The deflection of the components is measured to ensure that the deflection is within design tolerances. Previous measuring methods included manually measuring the relative positions of a number of points on the component using a hand tool to determine the overall deflection of the component.

BRIEF DESCRIPTION OF THE INVENTION

According to one aspect of the invention, a deflection measurement probe includes a body portion having a cavity defined by the body portion, a first positional measurement sensor disposed in the cavity of the body portion, the first positional measurement sensor including a sensor tip extending from the body portion operative to contact a measurement surface, and a second positional measurement sensor disposed in the cavity of the body portion, the first positional measurement sensor including a sensor tip extending from the body portion operative to contact a measurement surface.

According to another aspect of the invention, a measurement system includes a processor and a measurement probe communicatively connected to the processor, the measurement probe comprising a body portion having a cavity defined by the body portion, a first positional measurement sensor disposed in the cavity of the body portion, the first positional measurement sensor including a sensor tip extending from the body portion operative to contact a measurement surface, and a second positional measurement sensor disposed in the cavity of the body portion, the first positional measurement sensor including a sensor tip extending from the body portion operative to contact a measurement surface.

According to yet another aspect of the invention, a method for measuring deflection of a surface of an object includes aligning a measurement probe assembly with the surface of the object, disposing an alignment pin of the measurement probe assembly on the surface of the object, applying a force to the measurement probe assembly such that sensor tips of the measurement probe assembly contact the surface of the object, instructing a processor communicatively connected to the measurement probe assembly to measure the position of the sensor tips, and calculating a difference in relative position of the sensor tips.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
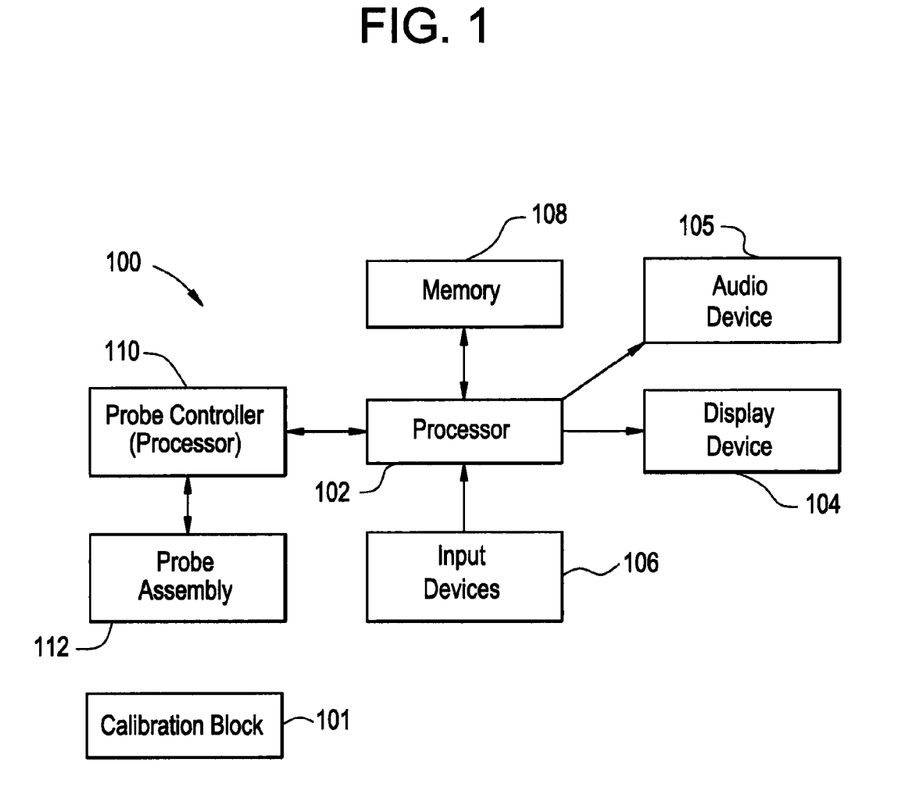
FIG. 1 illustrates a perspective view of an exemplary embodiment of an inspection system.

FIG. 1 illustrates a perspective view of an exemplary embodiment of an inspection system 100. The system includes a processor 102 communicatively connected to a display device 104, an audio device 105 such as a speaker, an input device 106 that may include, for example, a keyboard, mouse, or other type of input device, and a memory 108. A probe controller 110 is communicatively connected to the processor 102, and may include for example, a processor, input and output connections, and a power supply. A probe assembly 112 is communicatively connected to the probe controller 110. A calibration block 101 includes a flat surface that is operative to mechanically engage the probe assembly 112 during system calibration procedures. Though the illustrated embodiment shows a separate probe controller 110 and processor 102 in alternate exemplary embodiments, the probe controller 110 and the processor 102 may, for example, be included in a single housing unit, or share a single processor.

Figure 2:
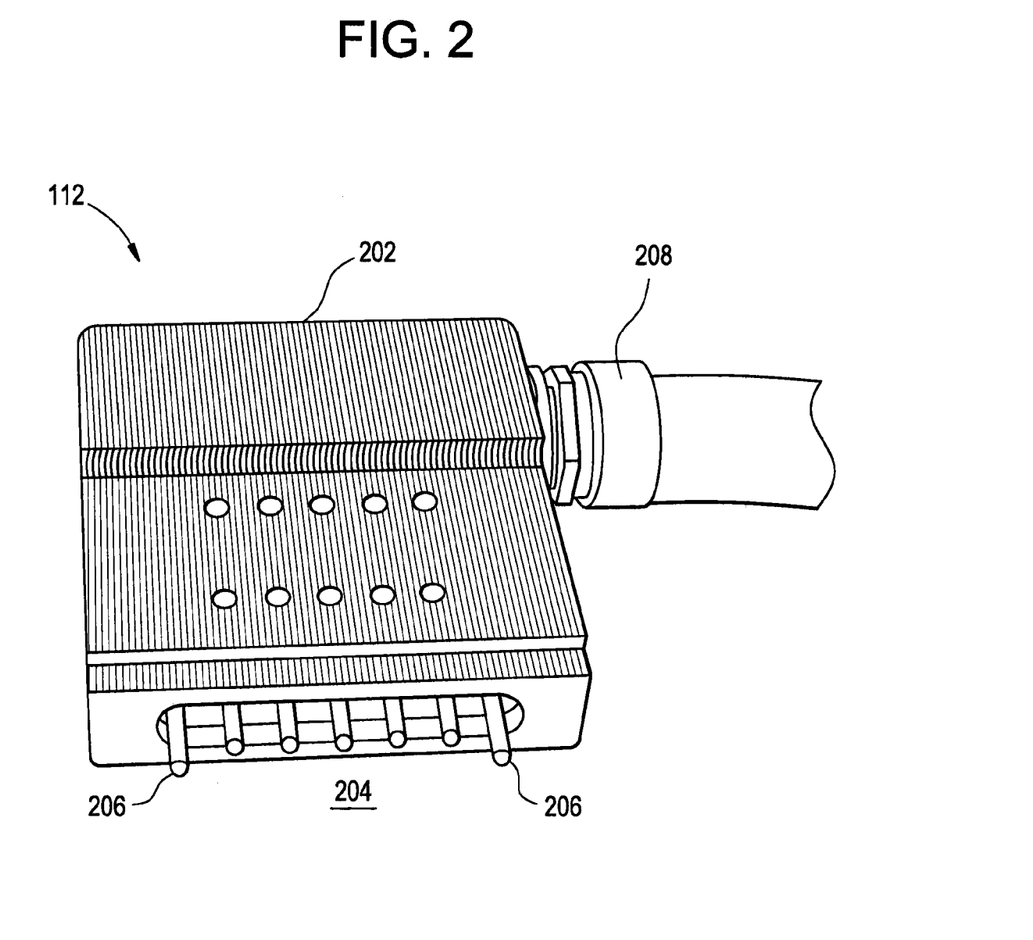
FIG. 2 illustrates a perspective view of an illustrated embodiment of a probe assembly.

FIG. 2 illustrates a perspective view of an illustrated embodiment of a probe assembly 112. The probe assembly 112 includes a body portion 202 and a plurality of transducers sensors disposed in the body portion 202. The sensors 204 of the illustrated embodiment are differential variable reluctance transducers (DVRT) however, alternate embodiments may include other types of sensors such as linear variable differential transformers (LVDT). Though the illustrated embodiment includes an arrangement of five DVRTs, alternate embodiments may include any number of DVRTs. The probe assembly 112 includes alignment pins 206 and a connector and cable assembly 208 that is connected to the probe controller 110 (of FIG. 1).

Figure 3:
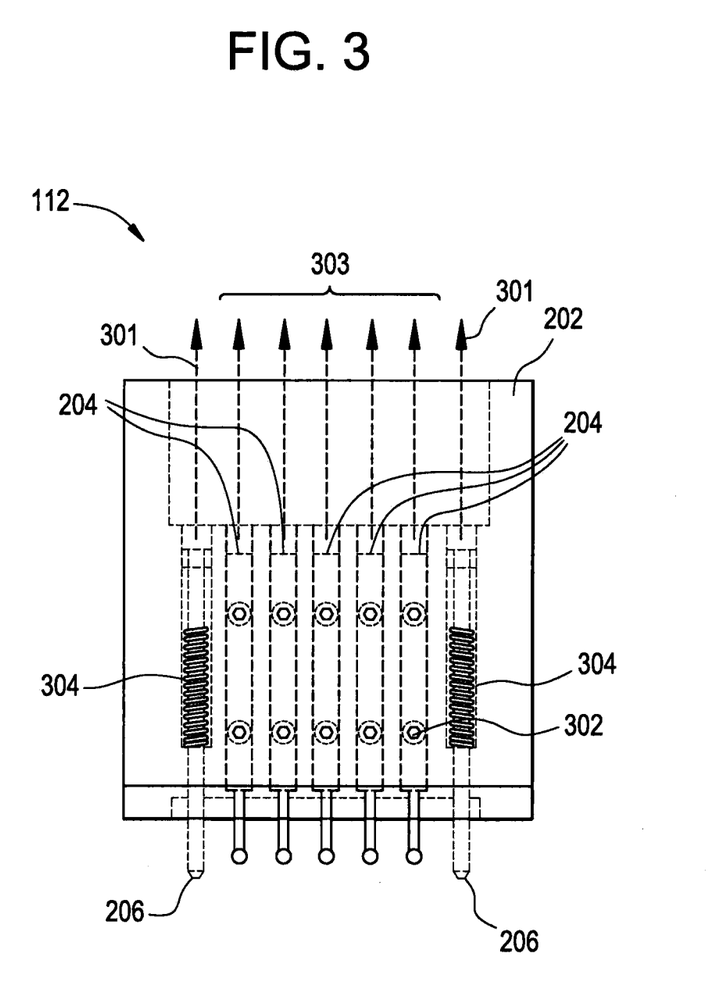
FIG. 3 illustrates a top partially cut-away view of the probe assembly.

FIG. 3 illustrates a top partially cut-away view of the probe assembly 112. In the illustrated embodiment, the sensors 204 are secured in a parallel and coplanar arrangement in an interior cavity of the body portion 202 by fasteners 302 however, alternate embodiments may secure the sensors 204 to the body portion 202 using other means such as, for example, an adhesive or epoxy material, a pinning arrangement or other type of fastening means. The longitudinal axes 301 of the alignment pins 206 are arranged in parallel and coplanar to the longitudinal axes 303 of the sensors 204 in the illustrated embodiment however, in alternate embodiments, the alignment pins 206 may be arranged in a different plane than the sensors 204. The alignment pins 206 are biased with springs 304 such that a compressive force along the longitudinal axis of the pins 206 will push the pins 206 into the body portion 202.

Figure 4:
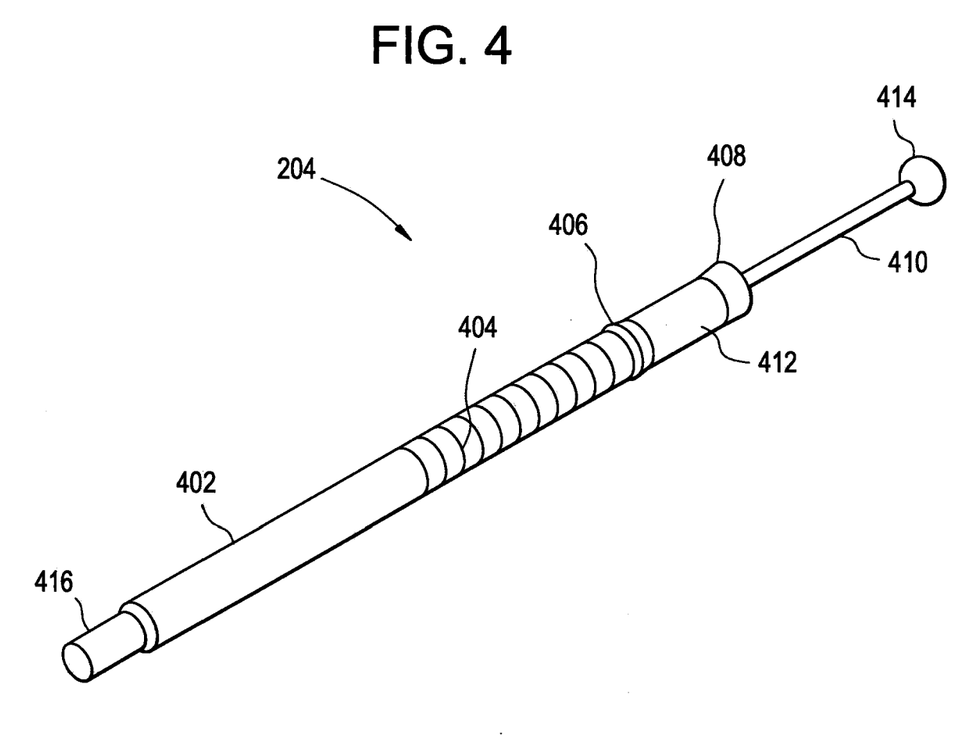
FIG. 4 illustrates a perspective view of an example of a sensor of FIG. 2.

FIG. 4 illustrates a perspective view of an example of a sensor 204. In the illustrated embodiment the sensor 204 is a DVRT type sensor that includes a sensor portion (coil) 402, a compressive spring 404, a spring stop 406, an end bearing 408 and a nickel titanium core 410 disposed in a tubular body portion 412. A spherical tip portion 414 is disposed on the distal end of the core 410. In operation, the position of the core 410 is detected by measuring the differential reluctance of the coil 402 using a sine wave excitation and synchronous demodulator (disposed in the probe controller 110 of FIG. 1) connected to the sensor 204 with a conductive lead 416.

Figure 5:
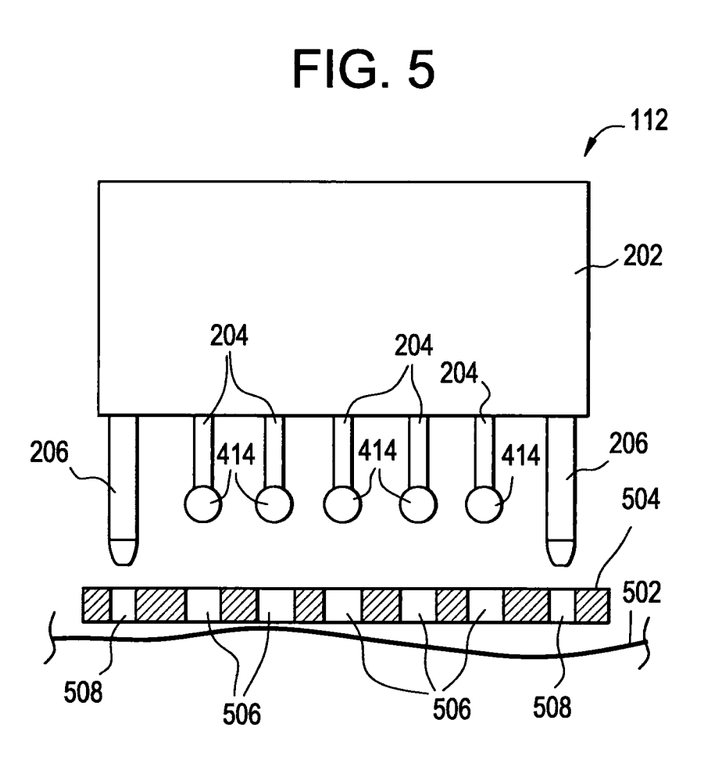
FIGS. 5-7 illustrate side views of the operation of the probe assembly of FIG. 2.
Figure 6:
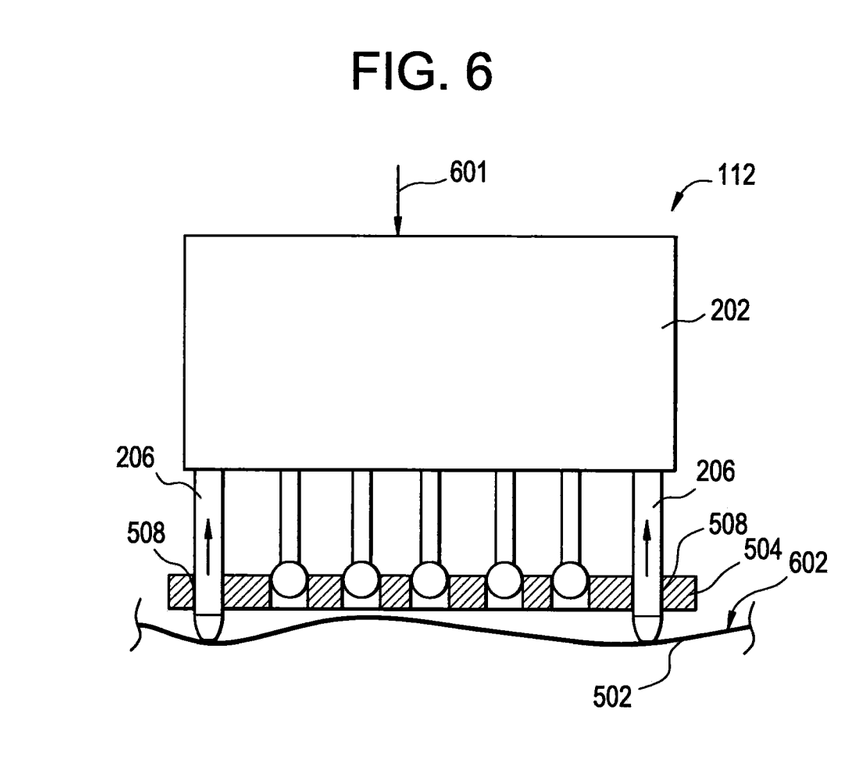
Figure 7:
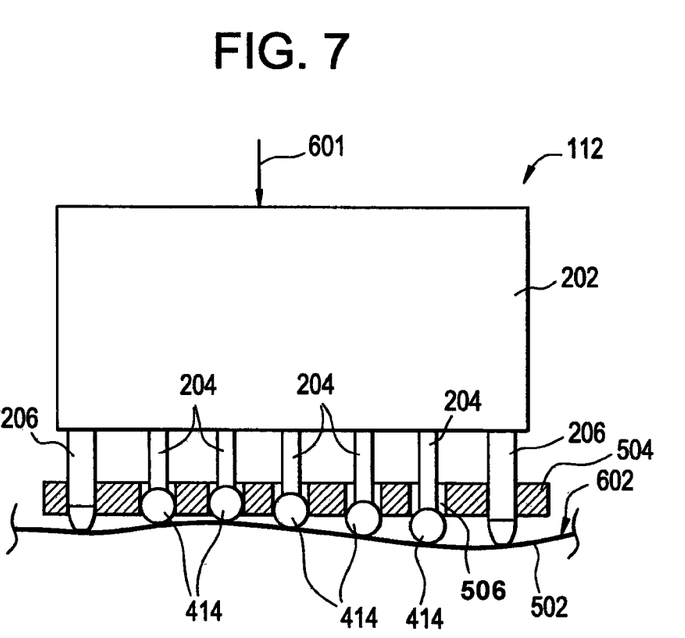

FIGS. 5-7 illustrate side views of the operation of the probe assembly 112. The illustrated embodiment includes a ripple spring 502 (test object), and a wedge 504 (alignment assembly or other surface). In the illustrated embodiment, the wedge 504 is used to secure the ripple spring 502 in position in an electrical machine. The alignment assembly 504 includes alignment pin holes 508 and orifices 506 that allow the probe assembly 112 to be repeatedly aligned in a particular position for repeated measurement tasks. The test object is not limited to ripple springs, and may include any object with a surface that may be tested for deflection. An alignment assembly is useful for repeated measurements; however an alignment assembly is not necessary to perform deflection measurements.

Referring to FIG. 6, in operation, a technician manually aligns the alignment pins 206 with the alignment pin holes 508 and inserts the alignment pins 206 into the alignment pin holes 508. The alignment pins 206 contact a surface 602 of the ripple spring 502 (test object). A force 601 is applied by the technician on the body portion 202 of the probe assembly 112 that compresses the spring biased alignment pins 206.

Referring to FIG. 7, the compression of the alignment pins 206 allows the tip portions 414 of the sensors 204 pass through the orifices 506 of the wedge 504 to contact the surface 602 of the ripple spring 502. The position of each of the tip portions 414 of the sensors 204 is determined by measuring the differential reluctance of the coil 402 (of FIG. 4). The position of each sensor 204 is output by probe controller 110 to the processor 102. The processor 102 calculates the differences in relative positions of each sensor 204 to determine an overall deflection of the ripple spring 502.

Figure 8:
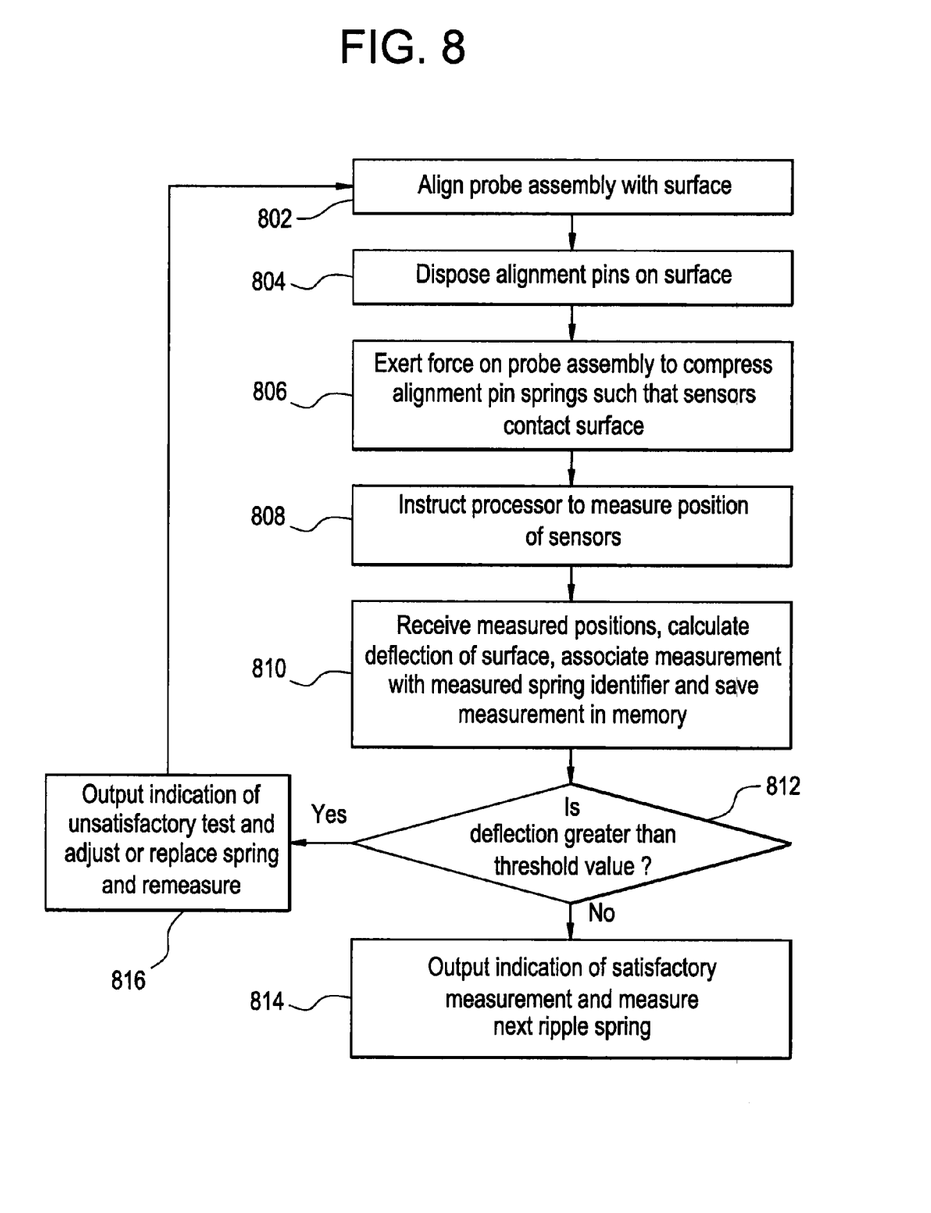
FIG. 8 illustrates a block diagram of an exemplary method for measuring the deflection of a component.

FIG. 8 illustrates a block diagram of an exemplary method for measuring the deflection of a ripple springs in an electrical machine similar to the ripple spring 502 (of FIG. 5) using the system 100 (of FIG. 1). Though the illustrated embodiment describes measuring a ripple spring 502 a similar method may be performed to measure the deflection of any material surface. In this regard, in block 802, the probe 112 is aligned with a test surface of the ripple spring 502. The probe 112 may be aligned using, for example, an alignment wedge or other alignment means such as a visual indicator or mark on the ripple spring 502. In block 804, the alignment pins are placed in contact with the surface of the ripple spring 502. A force is exerted by a technician on the probe 112 to compress the alignment pins 206 and induce contact between sensors 204 and the ripple spring 502 in block 806. In block 808, an instruction is sent to the processor 102 to measure the position of each sensor. The position of each sensor 202 is measured and the deflection of the surface (i.e., difference in relative position of each sensor tip) is calculated in block 810. In some embodiments, the measurement may be associated with an identifier of the measured ripple spring 502 and saved in the memory 108. In block 812, the measurement is compared to a specification threshold value (e.g., less than 20% deflection). If the measurement of deflection is less than the threshold value, an indication that the measurement is satisfactory may be output to a user in block 814. The output indication of a satisfactory measurement may include, for example, a visual indication on the display device 104 or an associated tone may be output by the audio device 105. If the measurement is greater than the threshold value, an indication of an unsatisfactory test is output in block 816, and the ripple spring may be adjusted or replaced and re-measured.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A deflection measurement probe to measure deflection of a measurement surface, the measurement probe comprising:
   a body portion having a cavity defined by the body portion;
   a first positional measurement sensor disposed in the cavity of the body portion, the first positional measurement sensor including a first sensor tip extending from the body portion operative to contact the measurement surface;
   a second positional measurement sensor disposed in the cavity of the body portion, the second positional measurement sensor including a second sensor tip extending from the body portion operative to contact the measurement surface;
   a first alignment pin; and
   a second alignment pin, wherein the deflection measurement probe determines the deflection of the measurement surface based on a difference in relative position of the first sensor tip and the second sensor tip.

2. The measurement probe of claim 1, wherein a longitudinal axis of the first positional measurement sensor is arranged in parallel with a longitudinal axis of the second positional measurement sensor.

3. The measurement probe of claim 1, wherein a longitudinal axis of the first positional measurement sensor is arranged coplanar with a longitudinal axis of the second positional measurement sensor.

4. The measurement probe of claim 1, wherein the first alignment pin is biased by a first spring and the second alignment pin are biased by a second spring.

5. The measurement probe of claim 1, wherein a longitudinal axis of the first alignment pin is arranged in parallel to a longitudinal axis of the first positional measurement sensor.

6. The measurement probe of claim 1, wherein a longitudinal axis of the first alignment pin is arranged in parallel with a longitudinal axis of the second alignment pin, and the longitudinal axis of the second alignment pin is arranged in parallel with a longitudinal axis of the first positional measurement sensor.

7. The measurement probe of claim 1, wherein the first positional measurement sensor includes a differential variable reluctance transducer.

8. A measurement system to measure deflection of a measurement surface, the measurement system comprising:
   a processor;
   a measurement probe communicatively connected to the processor, the measurement probe comprising:
      a body portion having a cavity defined by the body portion;

a first positional measurement sensor disposed in the cavity of the body portion, the first positional measurement sensor including a first sensor tip extending from the body portion operative to contact the measurement surface;

a second positional measurement sensor disposed in the cavity of the body portion, the second positional measurement sensor including a second sensor tip extending from the body portion operative to contact the measurement surface;

a first alignment pin; and a second alignment pin, wherein the processor determines the deflection of the measurement surface based on a difference in relative position of the first sensor tip and the second sensor tip.

9. The system of claim 8, wherein a longitudinal axis of the first positional measurement sensor is arranged in parallel with a longitudinal axis of the second positional measurement sensor.

10. The system of claim 8, wherein a longitudinal axis of the first positional measurement sensor is arranged coplanar with a longitudinal axis of the second positional measurement sensor.

11. The system of claim 8, wherein the first alignment pin and the second alignment pin are biased by a spring.

12. The system of claim 8, wherein a longitudinal axis of the first alignment pin is arranged in parallel to a longitudinal axis of the first positional measurement sensor.

13. The system of claim of claim 8, wherein a longitudinal axis of the first alignment pin is arranged in parallel with a longitudinal axis of the second alignment pin, and the longitudinal axis of the second alignment pin is arranged in parallel with a longitudinal axis of the first positional measurement sensor.

14. The system of claim 8, wherein the first positional measurement sensor includes a differential variable reluctance transducer.

15. A method for measuring deflection of a surface of an object, the method comprising:

aligning a measurement probe assembly with the surface of the object;

disposing a first alignment pin and a second alignment pin of the measurement probe assembly on the surface of the object;

applying a force to the measurement probe assembly such that sensor tips of the measurement probe assembly contact the surface of the object;

instructing a processor communicatively connected to the measurement probe assembly to measure the position of each of the sensor tips; and calculating a difference in relative position of the sensor tips to determine the deflection of the surface of the object.

16. The method of claim 15, wherein the method further includes:

determining whether the difference in relative position of the sensor tips is greater than a threshold value; and outputting an indicative signal to a user responsive to determining that the difference in relative position of the sensor tips is greater than the threshold value.

17. The method of claim 15, wherein the method further includes, associating the calculated difference in relative position with a unique identifier of the surface of the object and saving the calculated difference in relative position with a unique identifier in a memory.

18. The method of claim 15, wherein the object includes a ripple spring of an electrical machine.

\* \* \* \* \*